United States Patent [19]

Rowland-Hill

[11] 4,149,360
[45] Apr. 17, 1979

[54] AXIAL THRESHER AND STRAW WALKER MEANS FOR COMBINE

[75] Inventor: Edward W. Rowland-Hill, Lancaster, Pa.

[73] Assignee: Sperry Rand Corporation, New Holland, Pa.

[21] Appl. No.: 872,942

[22] Filed: Jan. 27, 1978

[51] Int. Cl.² ............................................. A01D 41/06
[52] U.S. Cl. .................................... 56/14.6; 130/27 T
[58] Field of Search ....................... 56/14.5, 14.6, 12.9; 130/27 R, 27 T, 27 HF

[56] References Cited
U.S. PATENT DOCUMENTS

| | | | |
|---|---|---|---|
| 3,580,258 | 5/1971 | Stroburg et al. | 130/27 HF |
| 3,616,800 | 11/1971 | Rowland-Hill et al. | 130/27 T |
| 3,742,686 | 7/1973 | Rowland-Hill | 56/12.9 |
| 4,004,404 | 1/1977 | Rowland-Hill | 56/14.6 |

Primary Examiner—Russell R. Kinsey
Attorney, Agent, or Firm—C. Hercus Just; Frank A. Seemar; John B. Mitchell

[57] ABSTRACT

A combine harvester having crop cutting and elevating means at the forward end of the combine to deliver crop material to be threshed to a threshing compartment in which axial rotor and concave means thresh and axially move the crop material to straw walker means immediately rearward of said threshing compartment to separate straw and chaff from threshed crop material and discharge the straw and chaff from the rear end of the harvester.

6 Claims, 4 Drawing Figures

AXIAL THRESHER AND STRAW WALKER MEANS FOR COMBINE

BACKGROUND OF THE INVENTION

Combines employing axial flow type threshing means and grain separators have been devised heretofore. In general, said combines are provided with means to cut crop material and elevate it to the inlet end of a threshing compartment, sometimes employing augers to facilitate the feeding, and the threshing compartment enclosing either a single or a parallel pair of associated threshing rotors which cooperate with complementary concaves beneath the same and the rearward end of the rotors also have extensions thereon comprising separating rotors which coact with separating concaves which extend rearwardly from the threshing concaves. The thresed material then moves downwardly onto grain receiving means, such as pans which reciprocate rearwardly and move the threshed crop product material onto sieves which, for example, operate to separate the desired product from chaff and other waste material, said waste material, together with the straw or other similar waste material, all being discharged rearwardly from the combine.

High capacity combines of the axial flow type require substantial amounts of power, usually furnished by a suitably rated diesel engine, the principal object of which is to rotate the one or more rotors, including those in both the threshing and separating compartments since these require a major amount of the power supplied by the diesel motor. Most combines of this type also are of the mobile variety and another substantial portion of the power supply by the diesel motor is required to propel the combine forwardly during the operation thereof. A typical example of a combine of this type comprises the subject matter of U.S. Pat. No. 3,742,686 in the name of Edward William Rowland-Hill, dated July 3, 1973. Said patent discloses a twin rotor arrangement. There are also combines which employ only a single rotor and concave and a typical example of this type of combine comprises the subject matter of U.S. Pat. No. 3,534,742 in the name of William H. Knapp et al, dated Oct. 20, 1970.

It also is known to separate desired agricultural crop material, such as grain from chaff and straw, by the employment of reciprocating means known as straw walkers which vibrate in an axial direction and effect a sort of sieve action, to cause the desired products and some chaff to drop therethrough while straw and other stalk-like material is moved rearwardly to discharge the same at the rearward end of the combine. Various types of threshing means are associated with combines of this type, but as far as it is known, none of these combines employ an axial type threshing unit or means. However, one example of a combine in which straw walker means are employed comprises the subject matter of U.S. Pat. No. 3,580,258, in the name of Clark E. Stroberg et al, dated May 25, 1971, and in which a transversely extending threshing rotor and concave grate is provided to effect threshing of the crop material prior to passing the same to the straw walker unit in the combine.

SUMMARY OF THE INVENTION

It is one of the principal objects of the present invention to provide a combine which has the advantages of threshing crop material by an axially extending threshing rotor and concave with which means are associated to insure axial movement of the material to the inner end of the threshing rotor and concave, where the material is then discharged onto a rearwardly extending straw walker unit, as distinguished from utilizing an axially extending grain separating rotor and concave and thereby effecting substantial reduction in power requirements, as well as providing a substantially shorter threshing compartment and correspondingly shorter threshing rotor and concave disposed therein.

Another object of the invention for purposes of insuring axial movement of the material in the threshing compartment is to provide a series of spiral-like arcuate ribs which are supported within an arcuate shield complementary to the shape of the upper part of the path of movement of the rasp bars of the threshing rotor, whereby upon rotation of the rotors, the material will engage said spiral-like ribs and be moved thereby in an axial direction toward the rear end of the threshing compartment.

A still further object of the invention is to provide improved threshing and grain separating means by devices adaptable either to a single or multiple rotor type threshing means and effect a reduction in power necessary to operate the threshing and grain separating system of the combine.

Details of the foregoing objects and the invention, as well as other objects thereof, are set forth in the following specification and illustrated in the drawings comprising a part thereof.

DETAILED DESCRIPTION

Figure 1:
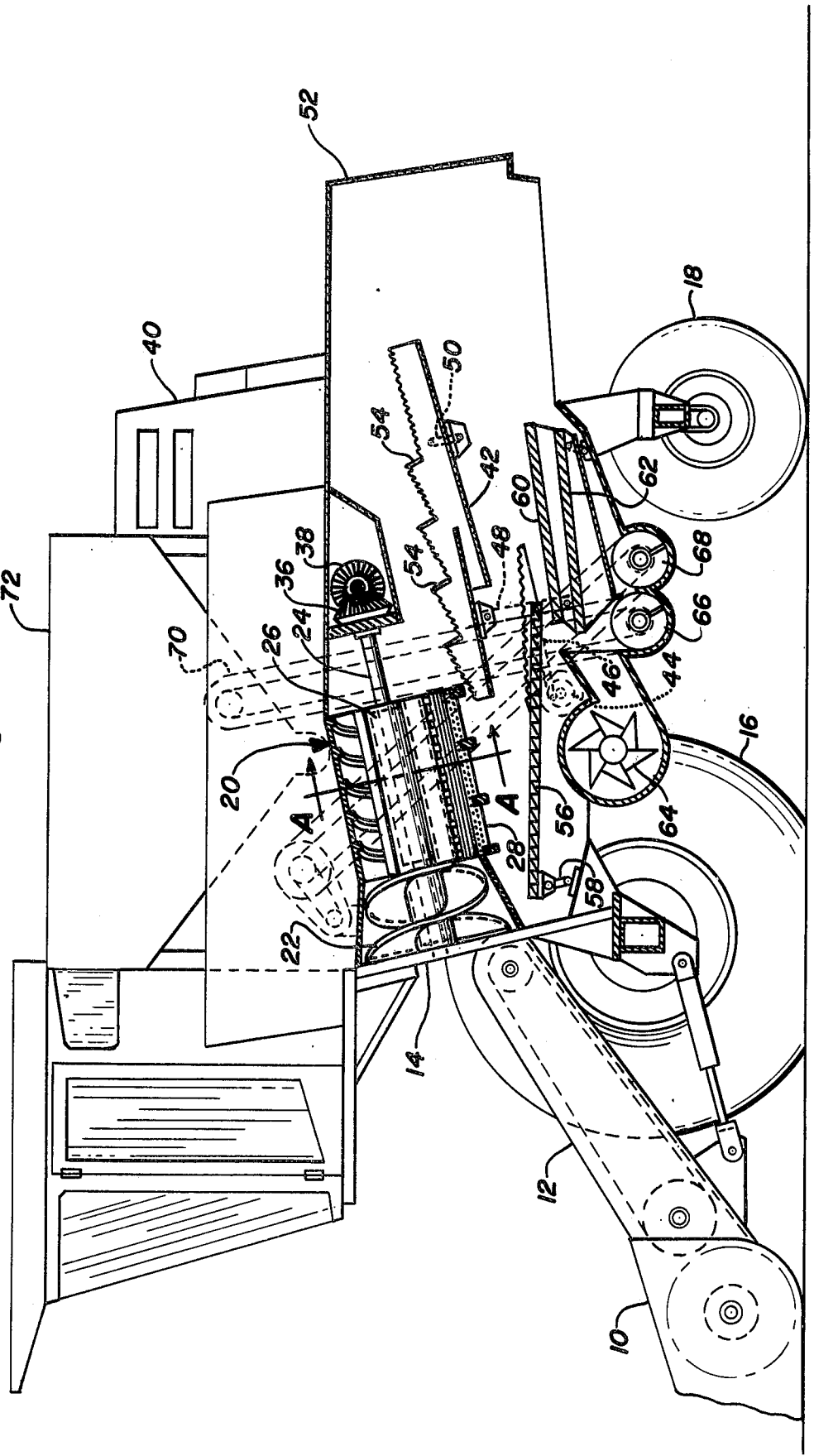
FIG. 1 is a side elevation, partially fragmentary and partially in longitudinal section to illustrate details of a combine in which the present invention is included.

Referring to FIG. 1, in particular, a typical combine of the type to which the present invention pertains is illustrated therein in side elevation. In said figure, a header 10 is fragmentarily illustrated and includes a conventional cutter arrangement for cutting crop material, which usually is consolidated toward the center for delivery to a conventional elevator 12, which is supported by the forward end of a frame 14, which, it will be understood, extends longitudinally of the combine in accordance with conventional construction, such as that shown in the aforementioned U.S. Pat. No. 3,742,686.

Figure 2:
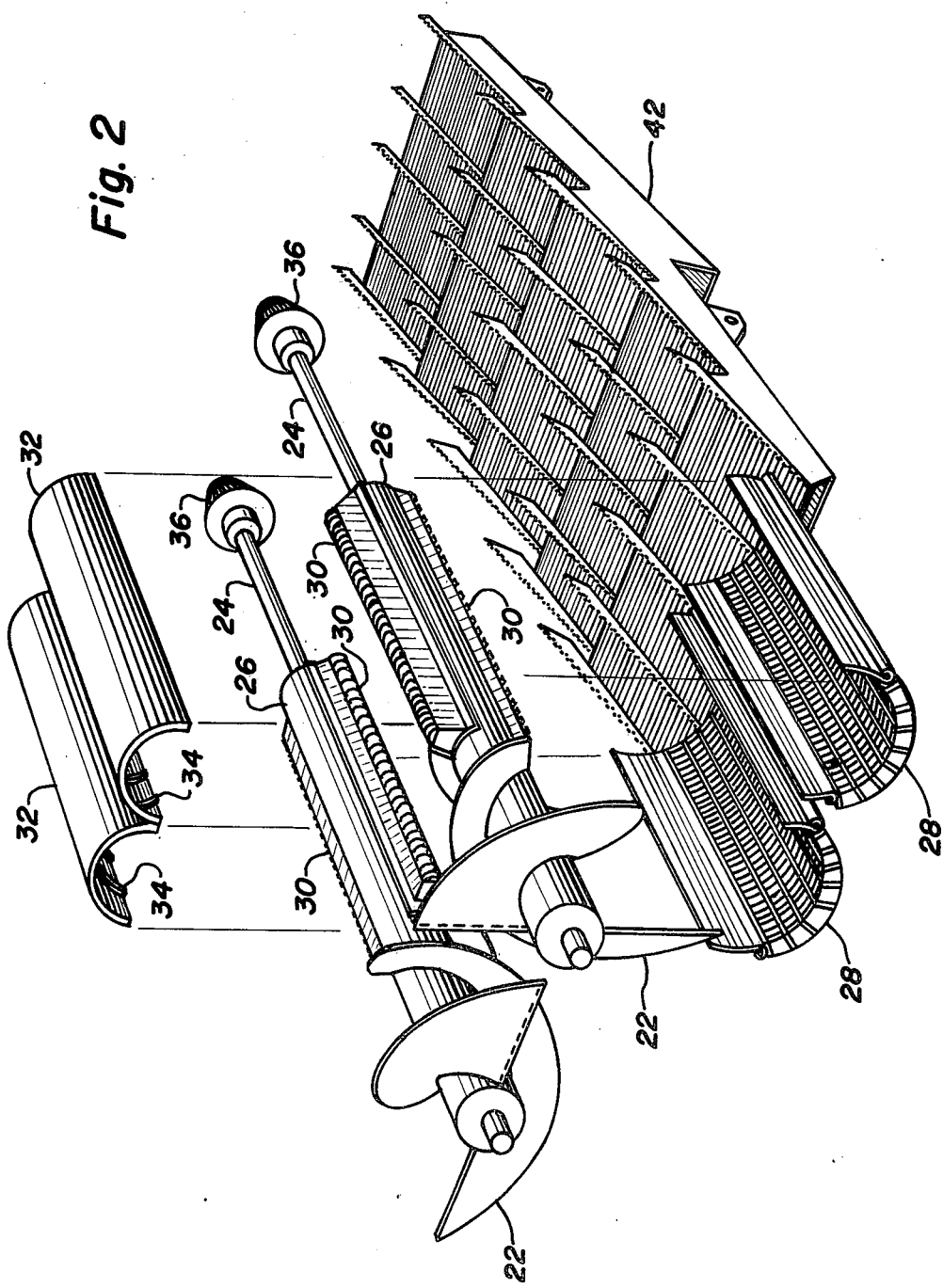
FIG. 2 is an exploded, somewhat diagrammatic illustration of the essential elements of the crop threshing and product separating system of the invention, said view being on a larger scale than employed in FIG. 1.

The frame 14 is supported by a pair of main drive wheels 16 and rear steering wheels 18. A threshing compartment 20 is mounted somewhat centrally of the machine, rearwardly of the upper end of the elevator 12 for purposes of receiving cut and consolidated crop material for threshing within the compartment 20. In the particular illustration shown in FIG. 1, augers 22 are mounted on the forward end of the central shaft 24, which extends axially through the compartment 20. The shaft 24 also supports the threshing rotor 26, details of several embodiments of which are illustrated respectively in FIGS. 2-4.

Also contained within the threshing compartment 20 and extending in axial direction are concave means 28 of conventional nature, the shape thereof being complementary to the path of movement of the rasp bars 30 of the threshing rotors 26. The upper portion of the rotors 26 also are enclosed by a concave shield member 32 on the inner surfaces of which, a series of longitudinally spaced, spiral-like ribs 34 are secured and, in relation to the direction of rotation of the threshing rotors 26, the angle of the ribs 34 within shield members 32 are directed in a manner to effect rearward, axial movement of the material being threshed and thereby subject the material continuously to the action of the rasp bars 30 and concave 28 for the full length of the threshing elements comprising the threshing rotors 26 and concaves 28. However, in contrast to the conventional combination threshing and separator rotors, such as those shown in said aforementioned U.S. Pat. No. 3,742,686, the rotors 26 and concaves are solely threshing rotors and are relatively short as compared to the overall combination threshing and separating rotors and concaves in said aforementioned patent.

Figure 3:
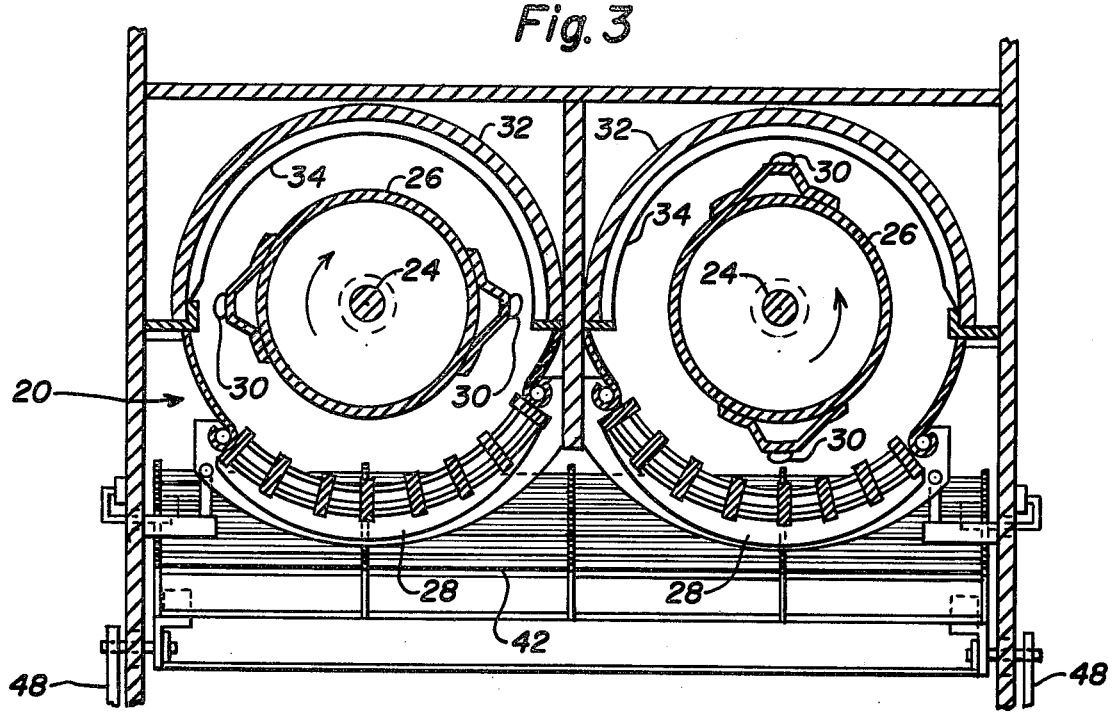
FIG. 3 is a vertical sectional view as seen on line A-A of FIG. 1 and showing on a larger scale than in FIG. 1, a multiple rotor and concave arrangement in which the principles of the invention are included

The rotors 26, in accordance with conventional practice in twin cylinder type combines are respectively rotated in opposite direction as indicated by the directional arrows shown in FIG. 3. The shafts 24 upon which the rotors are mounted are driven by conventional means such as the bevel gears 36 shown in FIG. 1, said gears 36 being driven by mating drive bevel gears 38 which, in turn, are suitably connected to the power means for the combine, not shown, which comprises a diesel engine or the like, mounted in housing 40, shown in FIG. 1. In view of the fact that no separating rotors and concaves are included in the combine in which the present invention is included, an engine of lower power rating may be used than that required to operate the combined threshing and separating rotors and concaves of the type shown in said aforementioned U.S. Pat. No. 3,742,686.

Communicating with the inner or discharge end of the threshing compartment 20 is a straw walker unit 42, which is reciprocated and otherwise agitated in a generally horizontal and axial direction relative to the longitudinal axis of the combine by means of a rotary crank 44, shown in FIG. 1, which operates link means 46 that are interconnected to vertical supporting links 48 which, together with shorter supporting links 50 near the rearward end of the combine, support the straw walker unit for said longitudinal vibratory shaking movement to advance the waste material, such as straw, progressively toward the discharge end of the combine housing 52, while any desired product material and some incidental chaff passes through the spaces 54 between the various sections of the straw walker unit for purposes of directing the threshed material onto the grain pan 56, which also is continuously reciprocated substantially horizontally by the rotary crank 44 and the link means 46, which are connected to one of a plurality of short supporting oscillating links 58 by which the grain pan 56 is supported for such reciprocatory movement. The grain and any chaff which is contained therein is progressively moved toward the inner or discharge end of the grain pan 56 in accordance with conventional practice for discharge onto agitated sieves 60 and 62 while air is blown across said sieves by a blower unit 64. It will be understood that the blower unit 64, the rotary crank 44, the transfer augers 66 and 68, and the elevator 70 are all suitably interconnected to the drive shaft of the engine within the housing 40, said connections being substantially of a conventional nature. The elevator 70 is for purposes of conveying the relatively clean crop product material to the grain bin 72.

In view of the relatively short and compart rotor and concave structure within the threshing compartment 20, it will be seen that in addition to the saving of power and operating energy, the combine may be constructed less expensively than the compound type of combine shown in said aforementioned U.S. Pat. No. 3,742,686, and depending upon the type of crops being harvested and the threshing requirements necessary for the same, it is conceivable that the overall linear dimension of the combine may be shorter than that of said aforementioned U.S. Patent.

Figure 4:
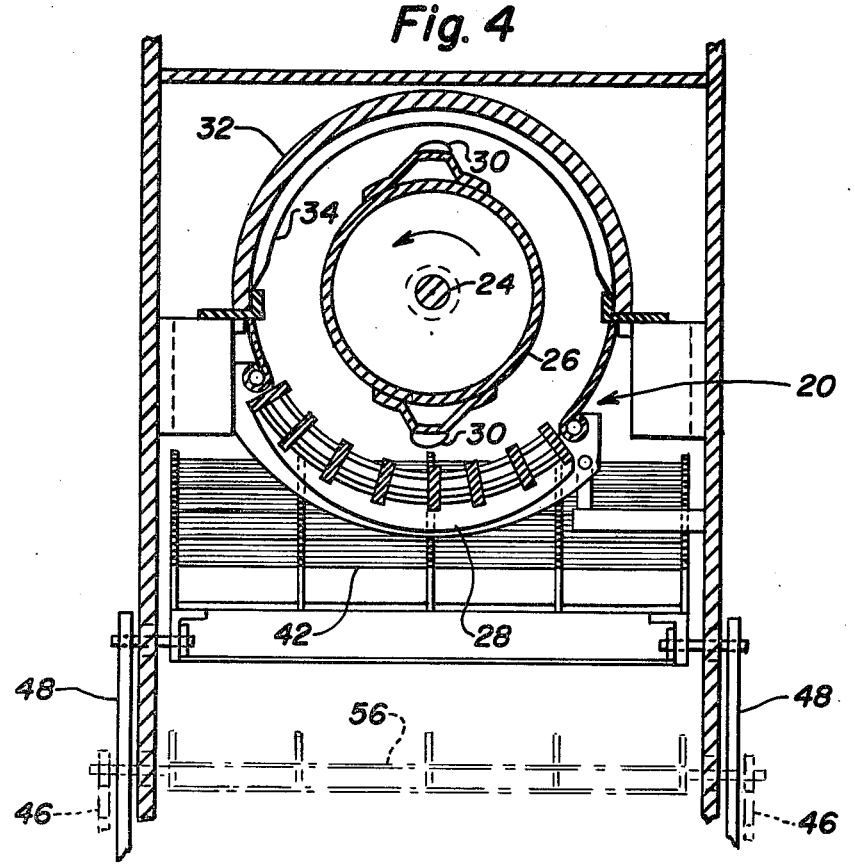
FIG. 4 is a view similar to FIG. 3 but illustrating the principles of the invention applied to a single rotor and concave type combine.

Referring to FIGS. 3 and 4, it will be seen that the benefits of the present invention are applicable to either a twin type of axial flow combine as exemplified in FIG. 3, or a single type axial flow combine such as exemplified in FIG. 4. In either of said embodiments, however, it will be seen that the straw walker unit 42 extends beyond the opposite lateral extremities of the threshing compartment 20 within which the coacting threshing rotor 26 and concave 28 are positioned for operation.

From the foregoing, it will be seen that the present invention provides a relatively simple axial flow type combine operated by more economical power means than in conventional types of combines in which combination threshing rotor and separating rotor and concaves are employed, yet the benefits of axial flow threshing are utilized, especially for purposes of forcibly moving the material being threshed in an axial direction, especially by means of the spiral-like ribs 34 in the concave shield members 32, in conjunction with the separating means afforded by the straw walker unit 42, which also requires minimum power to operate, and the product material is effectively separated and cleaned by the use of grain pans and separating sieves.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms show herein.

Having thus described the invention, what is claimed is:

1. A combine harvester comprising in combination, a mobile frame having forward and rearward ends, crop cutting and elevating means at the forward end of said frame, a threshing compartment supported by said frame rearwardly of said elevating means and extending in a generally axial direction within said frame between the opposite ends thereof, cooperating concave and threshing rotor means disposed axially within said threshing compartment, means adjacent said concave and threshing rotor means to move crop material axially along said compartment, power means supported upon said frame and connected to said threshing rotor to rotate the same about the longitudinal axis thereof for coaction with said concave to thresh crop material delivered to said threshing compartment, straw walker means disposed axially within said frame between the inner end of said threshing rotor and the rearward end of said frame and adapted to receive threshed crop products and waste material from said theshing compartment, means connecting said straw walker means to said power means to reciprocate the same in axial direction relative to said frame, grain sieve means below said straw walker means to receive threshed crop products from said threshing compartment and straw walker means to separate said crop material from waste chaff and the like, and grain receiving means beneath said concave and straw walker to receive relatively clean threshed crop products from said concave and straw walker.

2. The harvester according to claim 1 further characterized by said means adjacent said concave and threshing rotor means comprising an arcuate member positioned above said rotor means and provided with spiral-like ribs on the inner face thereof directed in relation to the rotary direction of the rotor means to induce axial movement of the material being threshed toward said straw walker means for further separation thereby of threshed product material from the waste material.

3. The harvester according to claim 2 further characterized by said concave and rotor means comprising a single rotor and coacting concave within said threshing compartment and said straw walker means comprising a plurality of successive angularly disposed sections adapted to shake threshed products from straw and the like and progressively feed said straw to the rearward end of said frame for discharge from the harvester, said straw walker means being at least as wide transversely as the width of said threshing means.

4. The harvester according to claim 1 further characterized by said concave and rotor means comprising a single rotor and coacting concave within said threshing compartment and said straw walker means comprising a plurality of successive angularly disposed sections adapted to shake threshed products from straw and the like and progressively feed said straw to the rearward end of said frame for discharge from the harvester, said straw walker means being at least as wide transversely as the width of said threshing means.

5. The harvester according to claim 1 further characterized by said concave and rotor means comprising a pair of rotors supported in transverse side-by-side arrangement in said threshing compartment and each of said rotors having a separate concave supported therebeneath in side-by-side relationship and said straw walker means extending transversely and commonly beneath said pair of concaves.

6. The harvester according to claim 5, wherein each of said rotors also has an arcuate member with spiral like ribs overlying the rotor means.

* * * * *